(No Model.)
A. ALDRICH.
LAWN MOWER.
No. 506,457. Patented Oct. 10, 1893.
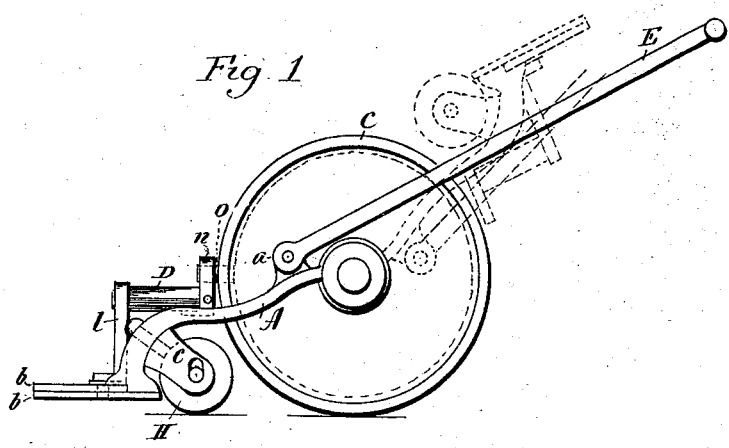
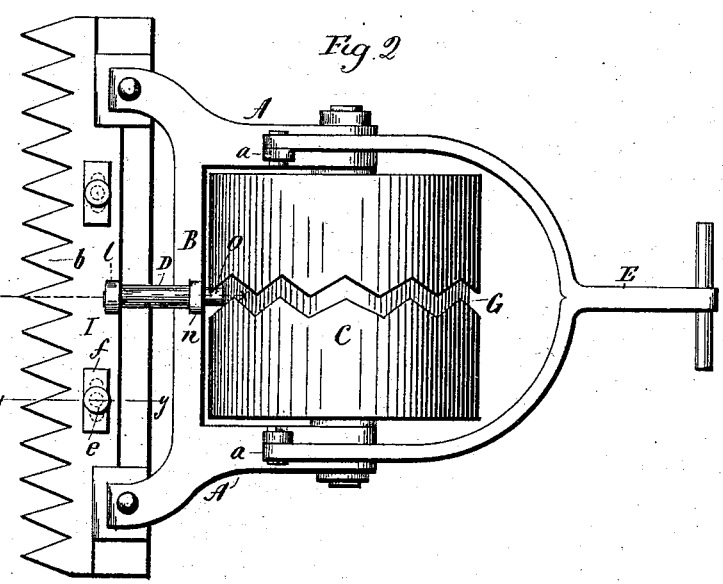
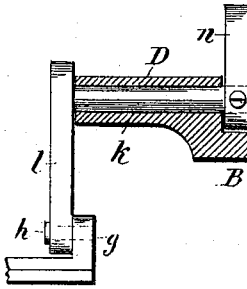
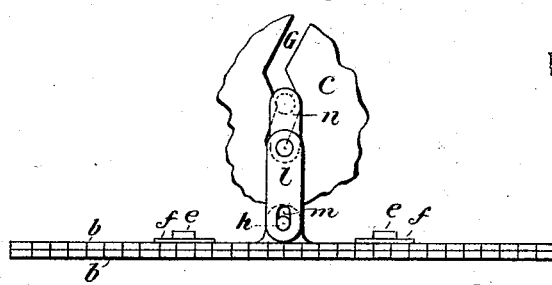
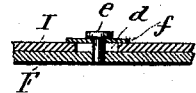
Witnesses.
J. H. Shumway
Lillian D. Kelsey
Aaron Aldrich
Inventor
By Atty
Earle Seymour

UNITED STATES PATENT OFFICE.

AARON ALDRICH, OF WATERBURY, CONNECTICUT.

LAWN-MOWER.

SPECIFICATION forming part of Letters Patent No. 506,457, dated October 10, 1893.

Application filed June 17, 1893. Serial No. 477,939. (No model.)

*To all whom it may concern:*

Be it known that I, AARON ALDRICH, of Waterbury, in the county of New Haven and State of Connecticut, have invented a new Improvement in Lawn-Mowers; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a lawn-mower constructed in accordance with my invention; Fig. 2, a plan view thereof; Fig. 3, an enlarged view in transverse section on the line $x$—$x$ of Fig. 2 showing the detachable driving connection between the movable cutter and the wheel or roller; Fig. 4, a view in transverse section on the line $y$—$y$ of Fig. 2 showing the mode of connecting the movable cutter to the stationary cutter; Fig. 5, a view in front elevation showing the two cutters and the driving connection between the movable cutter and the roller, only a small portion of which is seen.

This invention relates to an improvement in lawn-mowers, and particularly to that class having one or more reciprocating cutters, the object of the invention being to produce a simple, durable, convenient and effective machine, adapted to have its cutters readily disconnected from its driving mechanism, so that the machine may be propelled from place to place without operating the cutters.

With these ends in view, my invention consists in the construction as hereinafter described and particularly recited in the claims.

The frame of the machine consists of two curved side-bars A A, connected by a bar B, and adapted at their inner ends to receive the bearings of a driving-wheel or roller C. Upon the connecting bar B, and midway the length thereof, a sleeve D, is arranged, extending forward from the said bar, in a plane parallel with the plane of the said side-bars A A. The upper surfaces of the side-bars are constructed with bearings $a$ $a$ to receive the forked end of a handle E, which is pivotally secured thereto at points forward of the bearings of the driving-wheel or roller C. To the forward ends of the side bars a cutter plate F, is attached, its forward edge being serrated to form teeth $b$, in the usual manner.

The driving-wheel or roller C, is constructed with a central circumferential dog-tooth like cam G. This is preferably formed by constructing the wheel in two equal parts, and one edge of each part with equidistant notches, so that when the two parts are placed on the axle with their notched edges adjacent to each other, a circumferential cam will be formed between them. This is a common method of forming cam-wheels.

From the under face of each side bar near its forward ends, an arm $c$ depends, which carries two wheels H H, which are made adjustable vertically, so that the cutter plate may be raised or lowered with reference to the ground, and the length to which the grass is to be cut regulated.

Upon the cutter plate F, a cutter blade I is arranged, the forward edge of the blade corresponding to the forward edge of the plate. The blade is constructed with longitudinal slots $d$ $d$, through which screws $e$ $e$ are passed into the plate, and so that the blade is held closely upon the plate, yet permitted to slide longitudinally thereon. Preferably I arrange a spring $f$, between the heads of the screws and the blade, as seen in Fig. 4, which serves the two-fold function of yieldingly holding the blade on the plate, and of covering the slots in the blade, thereby avoiding the possible introduction of grass or gravel into the slots.

On the top of the cutter, midway of its length, is a stud $g$, from which a headless pin $h$ extends forward at a right angle thereto. The connection between the driving-wheel or roller C, and the cutter blade is a horizontal rock-shaft K, adapted to fit into the sleeve D, and furnished at its forward end with a depending arm $l$, the said arm being constructed with a vertically elongated slot $m$ near its lower end, to receive the said pin $h$. The inner end of the said rock-shaft is provided with a detachable upright arm $n$, carrying at its upper end a rearwardly projecting stud $o$, which enters the cam G formed in the roller or wheel C. The lower end of the said arm $n$ is furnished with a set-screw $p$, by means of which it is detachably connected with the inner end of the rock-shaft, or the screw $p$ may be replaced by any equivalent coupling device. By preference the inner end of the shaft is made angular, and the lower end of the said arm constructed with a corresponding opening. This would prevent the arm from turning on the shaft. I have not shown such a construction as it is well known.

In operation, the machine being propelled, the roller C revolves, and the stud o, extending into the cam therein, is oscillated thereby, and through the medium of the upright arm n, oscillates the rock-shaft which in turn oscillates the arm l, and the cutter-blade, so that the teeth thereof move rapidly back and forth across the teeth of the cutter plate. The handle E, having its bearings in the frame forward of the axle of the roller, tends to force the forward end of the machine downward upon the roller, whereby the plate and blade are caused to closely follow the irregularities of the ground, and cut the grass uniformly.

In rolling the machine from one place to another, it is often desirable to disconnect the cutters from the roller, and this is accomplished by simply removing the screw p, which will permit the removal of the shaft K, and its arm l, and also the arm n, and its stud o. The forward end of the machine may now be raised and turned rearward, as shown in broken lines in Fig. 1, and so that the bar B will rest upon the handle, in which position the machine may be propelled without operating the cutters. It will be seen that by this construction I produce a machine of few parts, in which the cutters are positively operated by the roller, and readily disconnected from their driving mechanism.

I am aware that a lawn-mower comprising a frame, a cam-faced wheel, a stationary and a movable cutter, and a rock-shaft mounted in the frame and provided with an arm furnished with a stud which coacts with the cam, and with an arm connected with the movable cutter and whereby the rotation of the driving wheel imparts reciprocating movement to the said cutter is old, and I do not broadly claim that construction.

Having fully described my invention, what I claim as new, and desire to secure by Letters Patent, is—

1. In a lawn-mower, the combination with its frame and a fixed and a movable cutter carried by the frame, of a driving wheel or roller having a circumferential cam, a rock-shaft mounted in front of said roller, an arm attached to one end of the shaft and connected with the movable cutter, and a second arm provided with a pin coacting with said cam, said second arm being detachably connected with the other end of the shaft, whereby its removal is permitted without removing the cutters, so that the machine may be run along the ground, and not operate the movable cutter, substantially as shown and described.

2. In a lawn-mower, the combination with the frame thereof, of cutters, one of which is movable, a driving-wheel or roller mounted in the rear end of the frame, and constructed with a circumferential cam, detachable driving connections between the said roller and the movable cutter, and a handle pivotally connected with the frame at a point forward of the bearings of the roller, substantially as described, and whereby when the said cutter is disconnected from the roller, the frame may be lifted and thrown back to rest upon the handle, the forward end of which is then situated in the rear of the bearings of the roller.

In testimony whereof I have signed this specification in the presence of two subscribing witnesses.

AARON ALDRICH.

Witnesses:
WILLIAM B. COULTER,
WILLIAM FRAY.